United States Patent [19]
Ashby, III et al.

[11] Patent Number: 5,852,803
[45] Date of Patent: Dec. 22, 1998

[54] APPARATUS, SYSTEM AND METHOD FOR RECORDING AND/OR RETRIEVING AUDIO INFORMATION

[75] Inventors: James C. Ashby, III; Roy G. Tiemann, both of Priddy, Tex.

[73] Assignee: Chips International, Inc., Priddy, Tex.

[21] Appl. No.: 854,192

[22] Filed: Mar. 20, 1992

[51] Int. Cl.[6] ................................................. G10L 7/08
[52] U.S. Cl. ................................ 704/270; 704/272
[58] Field of Search ................ 381/51–53; 395/2.79, 395/2.81; 434/185, 183, 309, 312, 313, 116

[56] References Cited

U.S. PATENT DOCUMENTS

| | | | |
|---|---|---|---|
| 3,462,157 | 8/1969 | Barnett et al. | 274/9 |
| 3,766,882 | 10/1973 | Babbitt, III | 116/121 |
| 4,337,375 | 6/1982 | Freeman | 395/2.69 |
| 4,361,408 | 11/1982 | Wirtschafter | 368/10 |
| 4,368,988 | 1/1983 | Tahara et al. | 368/63 |
| 4,381,558 | 4/1983 | Bearden | 369/68 |
| 4,391,530 | 7/1983 | Wakabayashi et al. | 368/63 |
| 4,405,241 | 9/1983 | Aihara et al. | 368/63 |
| 4,419,016 | 12/1983 | Zoltan | 368/10 |
| 4,448,541 | 5/1984 | Wirtschafter | 368/10 |
| 4,548,511 | 10/1985 | Yabe | 368/10 |
| 4,602,152 | 7/1986 | Dittakavi | 434/185 |
| 4,611,262 | 9/1986 | Galloway et al. | 361/421 |
| 4,630,301 | 12/1986 | Hohl et al. | 381/36 |
| 4,631,715 | 12/1986 | Hoover | 369/68 |
| 4,646,350 | 2/1987 | Batra | 381/51 |
| 4,660,991 | 4/1987 | Simon | 368/10 |
| 4,678,093 | 7/1987 | Allen | 369/63 |
| 4,731,765 | 3/1988 | Cole et al. | 368/10 |
| 4,768,177 | 8/1988 | Kehr et al. | 368/10 |
| 4,791,741 | 12/1988 | Kondo | 395/2.81 |
| 4,890,259 | 12/1989 | Simko | 365/45 |
| 4,905,213 | 2/1990 | Masse et al. | 368/10 |
| 4,989,179 | 1/1991 | Simko | 365/45 |
| 5,016,230 | 5/1991 | Seifers et al. | 368/10 |
| 5,097,429 | 3/1992 | Wood et al. | 364/569 |
| 5,099,463 | 3/1992 | Lloyd et al. | 368/10 |

FOREIGN PATENT DOCUMENTS

| | | |
|---|---|---|
| 8810489 | 12/1988 | European Pat. Off. . |
| 3532259 | 3/1987 | Germany . |

*Primary Examiner*—David R. Hudspeth
*Attorney, Agent, or Firm*—Kevin L. Daffer; Conley, Rose & Tayon

[57] ABSTRACT

An apparatus, system and method is provided for recording and retrieving voice information into a label attachable to a product. The voice information provides a more readily identifiable indicator of the characteristics or contents of the product than conventional written information or labels attached to the product. The label can be accessed from voice information submitted into or from a remote programmer attachable to, or in communication with, the label.

4 Claims, 4 Drawing Sheets

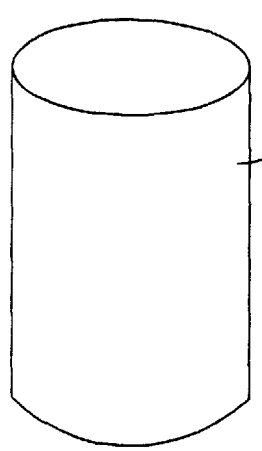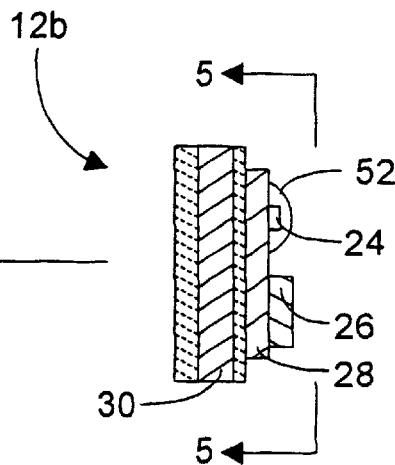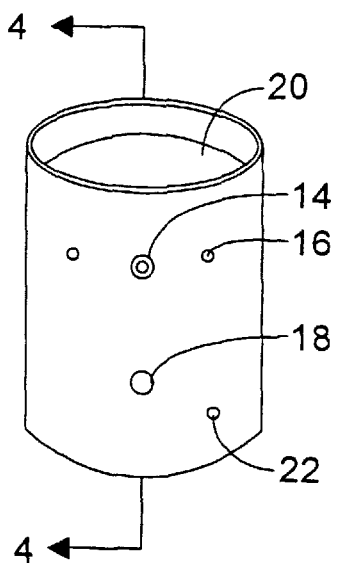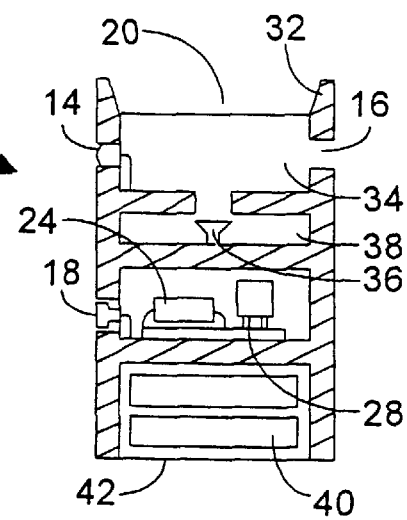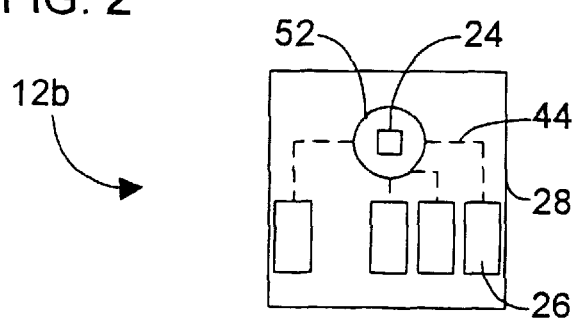
FIG. 1
FIG. 3
FIG. 2
FIG. 4
FIG. 5

APPARATUS, SYSTEM AND METHOD FOR RECORDING AND/OR RETRIEVING AUDIO INFORMATION

BACKGROUND OF THE INVENTION

1. Field of the Invention

This invention relates to an apparatus, system and method for recording and/or retrieving audio information. In particular, the apparatus, system and method hereof acts as an audio label for voice identifying a product to which the label can be attached.

2. Description of the Relevant Art

Identity, contents and instructions for use or assembly of a product are often written in a manual associated with the product or on a label attached to the product. Written information in manuals or on labels are provided on almost every product available to help the consumer or user of the product identify the product and the proper use of that product. While written information is satisfactory for the majority of people, written information is sometimes meaningless to the visually impaired or illiterate consumer. Pursuant to Americans With Disabilities Act of 1990, and similar regulations relating thereto, counseling of impaired consumers as to certain products may require that information regarding the product be presented in other than written form.

As the expected life span of the population increases, the number of elderly people who are visually impaired also increases. Often times, elderly people have difficulty reading simple instructions regarding the products necessary for their continued well being. Such products certainly would include prescription medicants having labels which dictate time and quantity of dosage. Moreover, immigrants, or people of which the native language is unrecognizable or is their second language, those people require help in understanding information about a product. Often times, immigrants learn to speak their new language before they can read or write the language. Similar to elderly people, immigrants may also find it less difficult to recognize and understand audio information as opposed to counter-part written information.

With the rapid rise in both immigrant and elderly population, it is important that product information be brought to their attention in a simple, easily recognizable fashion. Misinformation regarding certain products could prove hazardous to the ill-informed buyer or user. It is therefore important that the information being fed to the user or buyer be one that he or she is most familiar with and therefore can be more easily recognized.

SUMMARY OF THE INVENTION

The problems outlined above are in large part solved by the apparatus, system and method of the present invention. That is, the recording and/or retrieving apparatus, system and method hereof provides easily recognizable audio information to the buyer or user about the product of interest. The present invention uses an audio label which can be adapted for and attached or attachable to various products. Voice or audio information can be transmitted and stored inside the label for subsequent playback or retrieval by the consumer. A manufacturer, instructor, or even the consumer himself can record his voice concerning the product and place that voice information inside the label for subsequent playback by the consumer. Alternatively, the manufacturer, instructor, or consumer can record his voice concerning the product corresponding to a bar code placed upon the product. The bar code can be read and audio information corresponding to that bar code be output to the consumer as an instructional device using existing bar code labels associated with many off-the-shelf products. Using either technique, i.e., an audio label which contains voice information or a bar code which can access voice information, the consumer can rapidly assimilate familiar voice information concerning the product instead of running the risk of misreading a conventional written label. Not only is the audio labeling apparatus, system and method hereof more convenient for the end user, but it is also more easily input and, if need be, changed by the manufacturer, instructor or consumer. In the dynamic world in which we live, rapid communication of information is necessary to meet the growing demands in the marketplace.

Broadly speaking, the present invention contemplates an instructional apparatus comprising a label which can be attached to a product. As used herein, "product" includes any commodity having an outer packaged configuration of various size and shape. The product may include, e.g., consumable or non-consumable goods which may be contained in a package or bottle. An exemplary consumable good may include prescription or non-prescription medicine, etc. Non-consumable goods may include any good which is packaged with a label, manual or has a warning as to proper operation or use of the good.

According to one embodiment of the present invention, the label includes a microphone mounted proximate to the external surface of the label to aid in converting an identifying vocal message to an electrical signal. A storage device may be operatively coupled to the microphone to sequentially receive and store the electrical signal. The storage device can operate in either analog or digital format. If the storage device stores analog format information, an analog input filter is used to receive the electrical signal and at least two sample and hold circuits are coupled to sequentially receive an analog format of the electrical signal. An array of addressable storage cells can be addressed to programmably write the analog format in a page addressed methodology. Alternatively, the storage device may operate in digital format using an analog input filter with sample and hold circuits placed on the input of an analog-to-digital converter. The analog-to-digital converter can receive the analog format and convert the analog format to digital format. An array of addressable storage cells can then programmably write or read the digital format into or from select cells.

According to one aspect of the above embodiment, a record switch may be mounted on the outer surface of the label. Upon activation, the record switch initiates the storage cycle such that the vocal message is transmitted from the microphone mounted upon the outer surface of the label to the storage device located within the label.

In accordance with another embodiment of the present invention, the label need not include a microphone. Instead, the label receives an electrical signal sent from a programming unit remotely placed from the label. Accordingly, the label may include at least one electrode mounted on the outer surface of the label and a storage device coupled to the electrodes to sequentially receive and store an electrical signal sent from the remote programming unit. Thus, the remote programming unit is separate from the label and can access the label either remotely or by physical contact with the label. The programming unit includes a microphone and a record switch for transmitting the vocal message into the storage device when the record switch is activated. Electrical signals from the microphone can be sent over a transmission path to the electrodes mounted on the outer surface of the label. The transmission path may include either an optical transmission path or physical connection between the label electrodes and the programming unit.

According to one aspect of either of the above embodiments, the vocal message stored within the label can be addressed and retrieved in a form substantially near its original format. The retrieved vocal message is sent to the consumer as telephone quality voice indicative of the identifiable characteristics associated with the product. The vocal message is retrieved from the storage device and sent to a speaker which receives a stored electrical signal from the device and converts the signal to a telephone quality voice signal substantially similar to the original vocal message placed within the device. Thus, the output voice signal is not internally synthesized. Instead, the output voice signal is simply the original voice message recalled in a form substantially similar to the original form. Similar to the microphone, the speaker can be associated with either the label or it can be mounted separate from the label on a remote programming unit. If the microphone and speaker are placed on the label, the label is self-contained and the remote programming unit is not needed. Conversely, if the microphone and speaker are placed on or connected to a remote programming unit, the label can be made much smaller since it need not contain the microphone, speaker and many of the other record/retrieval elements. A remote programming unit is therefore useful whenever the label must be small or inexpensive. A single remote programming unit can therefore be used with numerous labels to record and retrieve information into and from each label. Also, the record and playback function may be separated onto different units to restrict unauthorized programming of the label. Thus, one unit can only record and the other unit can only playback the recorded information.

According to yet another embodiment of the present invention, the label includes a bar code label attachable to a product. A vocal message can be recorded into a storage device corresponding to the bar code label. The storage device is remote from the bar code label and upon reading the bar code label, the vocal message stored therein is reproducibly retrieved so as to indicate the identifiable characteristics associated with the product. Therefore, according to this embodiment of the present invention, bar code information commonly placed upon existing products can be read and corresponding vocal message associated with the bar code can be output to the consumer. When a bar code is read from a product, bar code digital information is sent to the storage device which then activates a pre-programmed vocal message within a voice recorder and sends that message to a speaker which then reproduces the recorded message as telephone quality audio output.

The present invention also contemplates an audio labeling system including both a label and a remote programming unit for recording information into the label or retrieving information from the label via the programming unit. The label of the audio labeling system includes electrodes and a storage device or voice recorder mounted proximate to or within the label. The programming unit includes a record switch that, when activated, allows a vocal message to be written into the storage device and a play switch that, when activated, allows a stored electrical signal to be read into a speaker mounted on the outer surface of the unit.

According to one aspect of the audio labeling system, the remote programming unit can communicate with the electrodes using a transmission path (e.g., optical, infrared, etc.) which allows the label and remote programming unit to communicate with each other. According to another aspect of the system, the remote programming unit includes at least one lead on the outer surface of the unit which can be physically contacted or connected to at least one electrode on the outer surface of the label. Accordingly, whenever programming or re-programming is desired, the operator merely brings the remote programming unit in optical, infrared or physical contact with the label to either place one or more voice messages within the label or read from the label current voice messages.

The present invention also contemplates a method for audio labeling a product. The method includes the steps of attaching a label bearing an audio recorder to a product. Audio signals or vocal messages can be sent to the label where those signals are then recorded within the recorder. Upon demand, the audio signals can be subsequently retrieved from the recorder to, for example, audibly discern the contents of that product.

According to one aspect of the present method, changes in audio signals can be reprogrammed into the recorder to indicate a change in product to which the label is affixed. Thus, a label can be attached to a product such as a bottle of prescription medicine and, after the medicine has been fully used, the label can be re-programmed and placed on a different bottle of medicine having the attached label reprogrammed indicating a different instructions for use. The present invention can therefore be used to identify any characteristic associated with the product, including product type, contents of the product or pertinent instructions for use. Of course, all those characteristics being delivered in an easily recognizable verbal format from an audio storage device or recorder which may be affixed to the product itself.

BRIEF DESCRIPTION OF THE DRAWINGS

Other objects and advantages of the invention will become apparent upon reading the following detailed description and upon reference to the accompanying drawings in which:

FIG. 1 is a perspective view of a product;

FIG. 2 is a perspective view of a label according to one embodiment of the present invention attachable to a portion of the product;

FIG. 3 is a cross-sectional view of the label according to another embodiment of the present invention attachable to a portion of the product;

FIG. 4 is a cross-sectional view along plane 4—4 of FIG. 2;

FIG. 5 is a perspective view along plane 5—5 of FIG. 3;

Figure 6:
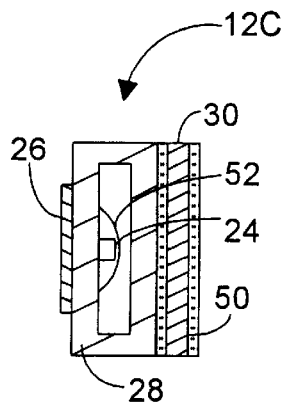
FIG. 6 is a cross-sectional view of the label according to another embodiment of the present invention.

While the invention is susceptible to various modifications and alternative forms, the specific embodiment thereof has been shown by way of example in the drawings and will herein be described in detail. It should be understood, however, that the drawings are not intended to limit the invention to the particular form disclosed, but on the contrary, the intention is to cover all modifications, equivalence and alternatives thereof which fall within the spirit and scope of the invention as defined by the appended claims.

DETAILED DESCRIPTION OF THE INVENTION

Turning now to the drawings, FIG. 1 illustrates a product 10 having characteristics which can be recorded as described below. Product 10 can be manufactured in various shapes and sizes and can contain contents which can be identified in voice recorded and/or retrieved audio or voice information. Product 10 may be a consumable or non-consumable good. An exemplary consumable good such as a prescription or non-prescription drug may be packaged in a bottle with device 12 affixed thereto. Instead of or in addition to a written label placed on the bottle indicating quantity and time of dosages, label 12 can be accessed to record and to retrieve vocal messages of such dosages. A consumer therefore can quickly retrieve the physician's voice, pharmacist's voice or his or her own voice information of the necessary dosage information. Moreover, as the dosage changes, the consumer, physician or pharmacist can update or re-program the voice information placed within label 12. Without departing from the scope of the present invention, product 10 includes any consumable or non-consumable product bearing important information necessary for the proper consumption or use of the product. Voice information can be recorded into label 12 attachable to product 10 by either the manufacturer, instructor, or end user. The programmed vocal message can be updated or re-programmed periodically to indicate instructional changes accorded to the product.

Referring to FIG. 2., one embodiment of a label 12 is shown in FIG. 2 as numeral 12a. Self-contained label 12a includes all the necessary elements for recording and retrieving identifying voice information associated with product 10. Arranged on or proximate to the outer surface of self-contained label 12a is a microphone 14 which, when held near a person's voice, can convert the voice information to a corresponding electrical signal. Microphone 14 is of common design and is capable of receiving directional voice while not receiving substantial amounts of background noise.

Also associated with label 12a are a plurality of sound channels or ports 16 arranged radially inward around the circumference of label 12a. Sound ports 16 allow retrieved voice information to exit label 12a when play/record button 18 is activated in a play mode. Play/record button 18 can be a two-way switch for enabling either a play mode or a record mode. If button 18 is placed in a play mode, then voice information stored within label 12a can be played or retrieved through sound ports 16. Conversely, if play/record button 18 is activated in a record mode, then sound information can be sent to and recorded within label 12a via microphone 16.

While any form of coupling or attachment between label 12a and product 10 falls within the scope of this invention, FIG. 2 illustrates one form of attachment whereby one end of product 10 can be placed within a tapered collar 20 of label 12a. Thus, if product 10 is cylindrical in shape, such as a prescription medicine bottle, the cylindrical container can be inserted into one end of label 12a. Once inserted, product 10 remains attached until released by a pulling force or a releasing mechanism (not shown).

Label 12a as well as alternative embodiments of labels 12b and 12c, etc. may also include an earplug jack or adaptor 22. Adaptor 22 can receive a male end of an earplug of common design. The earplug (not shown) can be inserted into the user's ear to aid those who are hearing impaired.

Referring to FIG. 3, an alternative low-profile label 12b is shown. Low-profile label 12b can be made much smaller than self-contained label 12a. Label 12b contains only those elements necessary to input or output electrical signals into or from the label. Conversion of a vocal message to or from the electrical signal is performed separate from label 12b. Accordingly, label 12b includes a storage device 24 and at least one electrode 26 mounted on an external surface of label 12b. Preferably, storage device 24 and electrode 26 are mounted on a flexible printed circuit (PC) board 28. PC board 28 is coupled to one side of a double-sided tape 30. The other side of double-sided tape 30 can therefore be conformed and attached to various surfaces, possibly being arcuate surfaces such as, for example, the side-wall of a cylindrically shaped product 10.

Illustrated in FIG. 4 is a cross-sectional view of the label 12a shown in FIG. 2. The inside walls 32 of tapered collar 20 may be resilient to allow one end of product 10 to be releasibly secured to label 12a. Arranged proximate the outer wall of label 12a is microphone 14, play/record button 18 and at least one sound port 16.

Tapered collar 20 allows product 10 to be slid between the outwardly resilient inside walls 32 of collar 20. Tapered collar 20 is intended to be the same geometrical shape as a portion of product 10 regardless of the general shape of that product.

Extending inward from port 16 is a sound baffle area 34 used to distribute the sound from speaker 36 contained within speaker chamber 38. Speaker chamber 38 thereby not only houses speaker 36, but also creates the sound waves that escape label 12a through sound ports 16.

Coupled to microphone 14 and play/record button 18 is a storage device 24. Storage device 24 may include a single integrated circuit or several integrated circuits (with or without additional discrete components) placed on a PC board 28. PC board 28 serves as routing of conductors placed therein. Each conductor is selectively connected to various input/output pins associated with microphone 14, play/record button 18 and/or speaker 36. As will be described below, input from microphone 14 and play/record button 18 activates recording of voice information into storage device 24. In addition, input from device 24 and from play/record button 18 activates speaker 36 for subsequent dispersion from label 12a through sound ports 16.

Associated with the recording and retrieval of voice information to and from storage device 24, is a power source or battery pack 40 shown in FIG. 4. Batteries of battery pack 40 can be interchanged via a cap 42 removably secured at one end of label 12a.

Shown as a front view along plane 5—5 of FIG. 3, FIG. 5 illustrates the outwardly projecting face of low-profile label 12b. Associated with the outer surface or face of label 12b is storage device 24 and one or more conductive electrodes 26 placed on the surface of PC board 28. Electrodes 26 can be made of highly conductive copper or aluminum and are attachable to electrical leads 44 placed within PC board 28. Leads 44 can be connected, for example, to various pins of an integrated circuit containing all necessary electrical functions of storage device 24. The electrical functions associated with storage device 24 will be described below.

Figure 8:
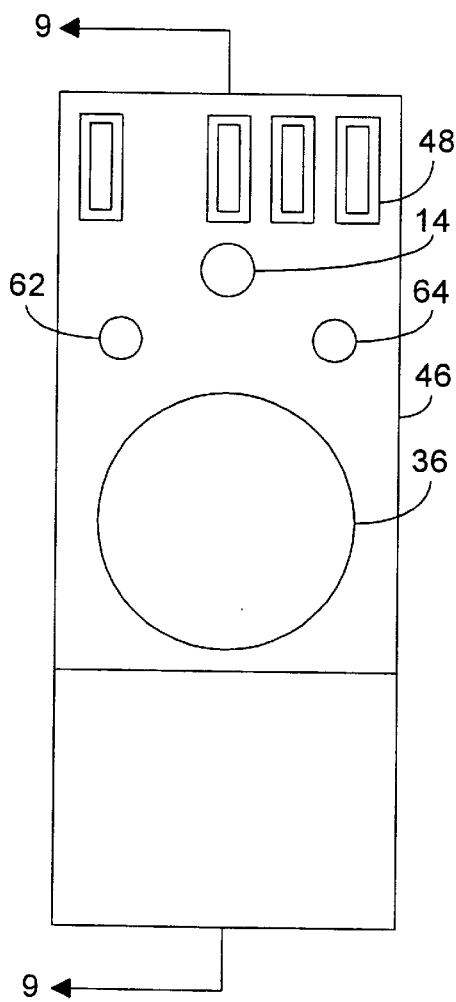
FIG. 8 is a perspective view of a remote programming unit according to the present invention.

Although conductive electrodes 26 are preferred, other transmissive receptors may be used to transmit or receive information from a remote programming unit 46 described below. Because low-profile label 12b contains only electrical storage and access means and does not contain all the necessary elements to store and retrieve voice information, various elements to achieve such functions are placed on remote programming unit 46 as shown in FIG. 8. Programming unit 46 can communicate via electrodes 26 to and from storage unit 24. Programming unit 46 may contain matching electrodes or leads 48, as shown in FIG. 8. Leads 48 may couple to electrodes 26 similar to a male/female coupling or, alternatively, can simply contact male-to-male. Still further, electrodes 26 and leads 28 can function as optical receivers and detectors to send voice information over an optical transmission path. Still further, other forms of transmission may be used such as, e.g., infrared, character recognition and/or bar code reader (as described below).

FIG. 6 illustrates a cross-sectional view of another label 12c which can be extremely miniaturized. Miniaturized label 12c utilizes less surface area by placing storage device 24 on one side of PC board 28 and electrode 26 on the other side of PC board 28. A cover 50 partially covers storage device 24 and provides a surface upon which double-sided tape 30 is placed. Tape 30 is of sufficient size to adhere to or stick upon the outer surface of product 10. Other forms of attachment other than a tape can be used. For example, suction cups, glue, or VELCRO® can be used in lieu of, or in addition to, tape 30. Whatever attachment form is chosen, it is important that it be flexible to allow device 24 to adhere to an arcuate or curved outer surface of product 10. The miniaturized version of label 12c thereby can be placed on extremely small products or in less-obtrusive areas of the product. It is within the realm of integrated circuit technology to make storage device 24 extremely small and thereby allowing miniaturized label 12c to be less than 1 or 2 inches square or less than 1 or 2 inches in diameter. Preferably, storage device 24 is encapsulated 52 as shown in FIGS. 3, 5 and 6. Encapsulation 52 such as epoxy encapsulation prevents contaminants from entering device 24 and disrupting normal electrical operations.

Figure 7:
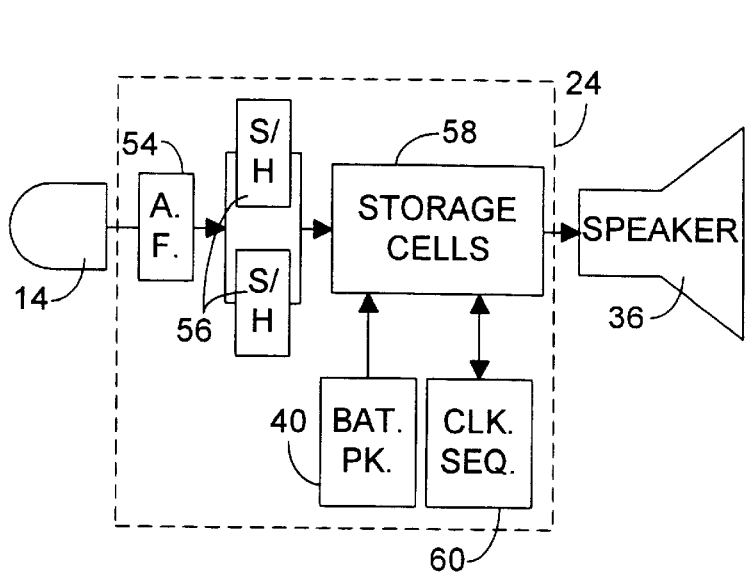
FIG. 7 is a block diagram of the vocal message signal path according to one embodiment of the present invention.

Illustrated in FIG. 7 is a block diagram of an analog circuit embodiment of the present invention. Specifically, voice information recording and retrieval can occur in either analog or digital format. FIG. 7 illustrates complete analog format, whereas FIG. 10 utilizes a conversion from analog-to-digital and from digital-to-analog. Preferably, the present invention utilizes complete analog storage and retrieval and thereby can be incorporated on a single storage device 24 available from Information Storage Devices, Inc. part Nos. 1012, 1016 or 1020, and generally described in U.S. Pat. Nos. 4,890,259 and 4,989,179 (herein incorporated by reference). As described in U.S. Pat. Nos. 4,890,259 and 4,989,179, storage device 24 includes an analog input filter 54 which receives analog electrical signals from microphone 14 and converts those signals to filtered analog output which is then input to at least two sample and hold circuits 56 which sequentially sample interleaved analog information and addressably write that information to an array of addressable storage cells, preferably EEPROM cells or flash memory 58. Row and column decoding of storage cells 58 is achieved using clock address sequencer 60. Power is supplied via power source or battery pack 40 to produce voltage boost necessary to program EEPROM cells.

Once addressed via control and timing logic associated with sequencer 60, electrical signals stored within array 58 are output to speaker 36. Control and timing logic within sequencer 60 also provides necessary timing for input of record (or write) information as opposed to output of retrieved (or read) information.

FIG. 8 illustrates a remote programming unit 46 capable of communicating with either low-profile label 12b or miniaturized label 12c. Communication path is achieved over a transmission channel between unit 46 and labels 12b or 12c, or by physical contact of electrical leads 48 with electrodes 26.

By using a remote programming unit 46, similar to that shown in FIG. 8, a manufacturer, instructor or consumer can input or program his voice information into one or more distal or connectable labels 12b or 12c. Moreover, the manufacturer, instructor or user can reprogram new or additional voice information with a single remote programmer 46 usable with any label having receptor electrodes or transmissive receivers. One or more labels can be associated with numerous products of various sizes, shapes and/or identifying characteristics.

Instead of a single play/record button 18 placed on the label 12a, as shown in FIG. 2, play/record button 18 can be separated into a separate play button 62 and record button 64. During record routine, record button 64 is actuated and the manufacturer, instructor or user speaks into microphone 14. Analog electrical signals are emitted from the microphone 14 through electrical leads 48 and onto electrodes 26. The encoded voice information is then fed onto label 12b or 12c and stored sequentially in a block of storage cells 58. During retrieval of voice information, play button 62 is actuated causing sequencer 60 to address specific storage cells 58 containing recorded electrical signals of analog format. The signals are then output via electrodes/leads 26 and 48 to speaker 38, wherein the electrical signals are converted to acoustical sound waves discernable to the listener.

Figure 9:
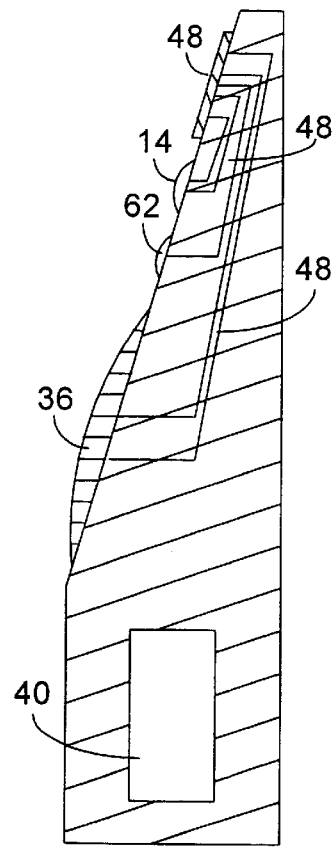
FIG. 9 is a cross-sectional view along plane 9—9 of FIG. 8.

FIG. 9 illustrates a cross-sectional view of remote programming unit 46 shown in FIG. 8. By grasping programming unit 46, and directing electrical leads 48 toward electrodes 26, the manufacturer, instructor or user of product 10 can record and/or retrieve voice information indicative of an identifiable characteristic associated with product 10. Earphones (not shown) can be attached to remote programming unit 46 to aid the hearing impaired. Battery pack 40 provides power to reprogram storage device 24 upon electrical contact between electrodes 26 and electrical leads 48. If electrical contact is not made, programming power may be provided within label 12b and 12c.

Figure 10:
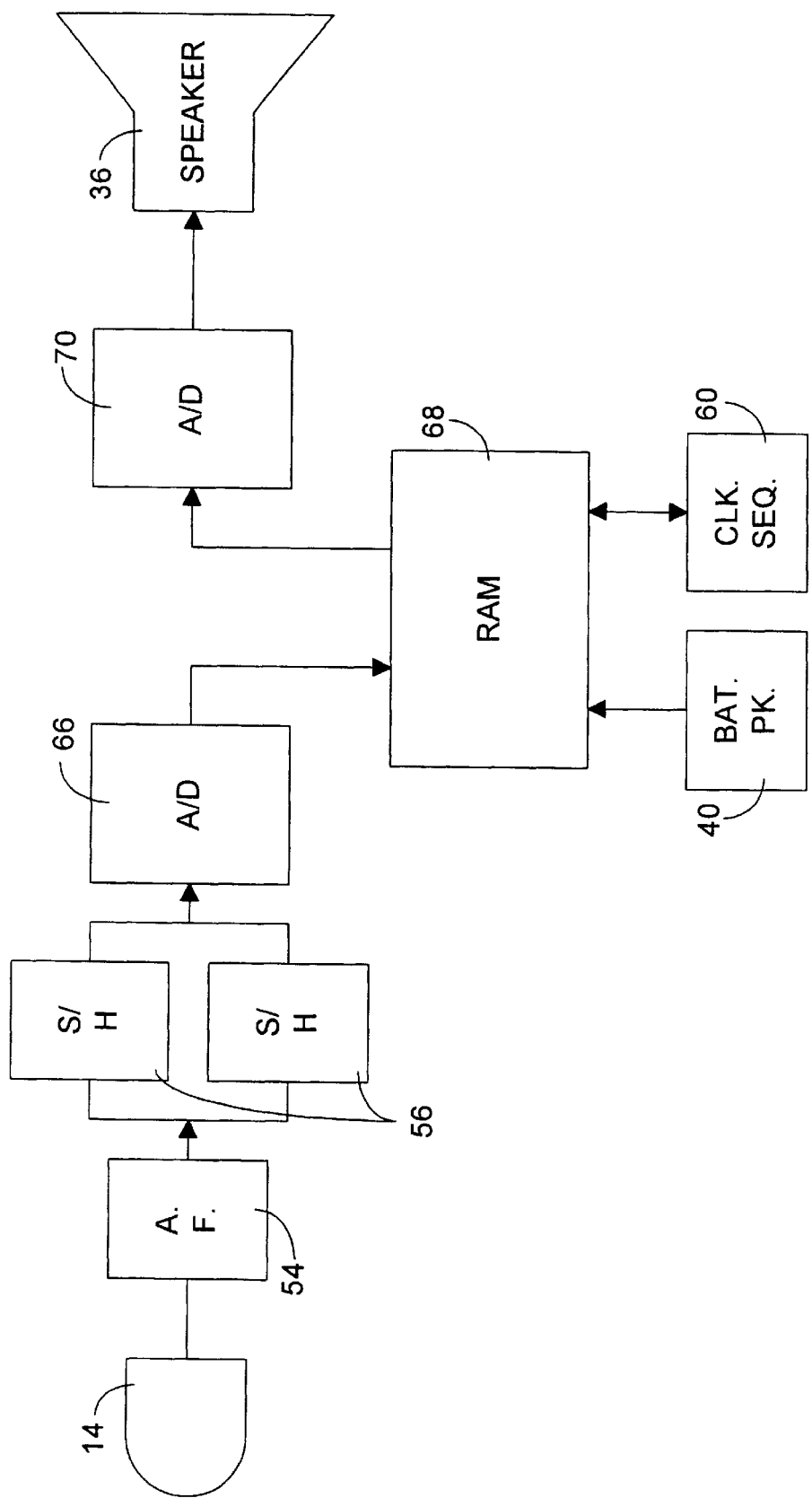
FIG. 10 is a block diagram of the vocal message signal path according to another embodiment of the present invention.

Although complete analog format is preferred, a digital format may be used similar to that shown in FIG. 10. In particular, sample-and-hold analog input can be converted by analog-to-digital converter 66 to a digital format. Digital information can then be stored in an array of storage cells 68 of conventional design, preferably a RAM exceeding one Megabit in size. Power can be supplied from battery pack 40 to refresh data stored therein. A clock address sequencer 60 may also be used to provide correct row and column sequence and addressing scheme. Upon retrieval, stored digital information is sent from storage cells 68 to digital-to-analog converter 70 which then amplifies the analog signal for proper reading by speaker 36. Alternative storage elements, other than RAM, may be used to store the digital information, including, but not limited to, static, dynamic, EEPROM, flash, core, bubble, light wave, magnetic, masked ROM or CD ROM. Clock address sequencer 60 orchestrates the memory address sequencing for play or record of the voice information. During the playback mode, the digitalto-analog converter 70 receives sequential information from the storage device 68 and converts this data into analog electrical signals readable by speaker 36.

Other digital techniques such as a digital signal processor (not shown) using a suitable voice coder/decoder algorithm such as, but not limited to, continuously variable slope delta modulation (CVSD), sub-band coders, or coded excited linear prediction (CELP) can also be implemented in the present digital design shown in FIG. 10. An exemplary encoder/decoder is Texas Instrument part No. TMS3477NL, an exemplary analog filter is Texas Instrument part No. TSP66C61NL and an exemplary memory device is Texas Instrument part No. TMS62256. Moreover, a suitable flash memory device may be useable as storage cells 68, and is produced by INTEL Corp., part No. I48F512. An advantage of flash memory is that, contrary to dynamic RAM, flash memory cells, once programmed, need not be continuously refreshed.

If digital conversion and storage techniques are used, a digital signal processor (DSP) may be employed. A suitable DSP is part No. TMS320C10 manufactured by Texas Instruments, Inc. An exemplary analog-to-digital converter or digital-to-analog converter is manufactured by Analog Devices, Inc., part No. AD7569. A digital signal processor combined with proper A/D or D/A converters could be combined with a suitable memory device such as those mentioned above, and using a sub-band coder algorithm as described in T. P. Barnwell, et al., "A real time speech sub-band coder using the TMS32010", *IEEE Southcon* (1984).

According to another embodiment of the instructional apparatus of the present invention, a bar code reader may be used to convert universal bar-code formats commonly printed on a bar-code label 72 into digital signals that can be interpreted by a terminal 74 remote from product 10 onto which label 72 is affixed. Terminal 74 can be placed at the point-of-sale area or it can be hand-held and usable by a consumer when browsing the shelves containing product 10. Thus, a consumer can rapidly assimilate vocal messages stored within hand-held terminal 74 by merely scanning bar code labels 72 arranged on the shelves. The consumer can thereby listen to recorded vocal messages placed within terminal 74 which identify the unique product upon which the bar code label is attached. Identifiable characteristics such as the contents of the product, type of product or instructions for use of the product being scanned are all verbally delivered to the consumer to aid his or her recognition of the product's preferred use. While conventional bar code systems identify products, the information is generally limited to the product name and/or price. Moreover, voice information retrieved from conventional bar code systems are generally computer synthesized and not actual reproduced human voice recordable by the manufacturer, instructor or consumer as in the present invention. The familiarity of a human voice (possibly the user's own voice) provides a substantial advantage over synthesized voice. Not only is actual recorded voice clearer than synthesized voice, but it can be recorded in, for example, the user's foreign language in a form familiar to the user.

When bar code 72 is read, digital information from the bar code activates a pre-programmed vocal message stored within terminal 74 concerning any information which is deemed necessary by the programmer, and which could be made available in a plurality of languages selectable by the user. Vocal messages can be re-programmed by adding a suitable record circuit. Features such as automatic tabulation of the cost of the products, display price, special product promotions, advertising, instructional information about the product, reduced price information, etc. may also be added.

Figure 11:
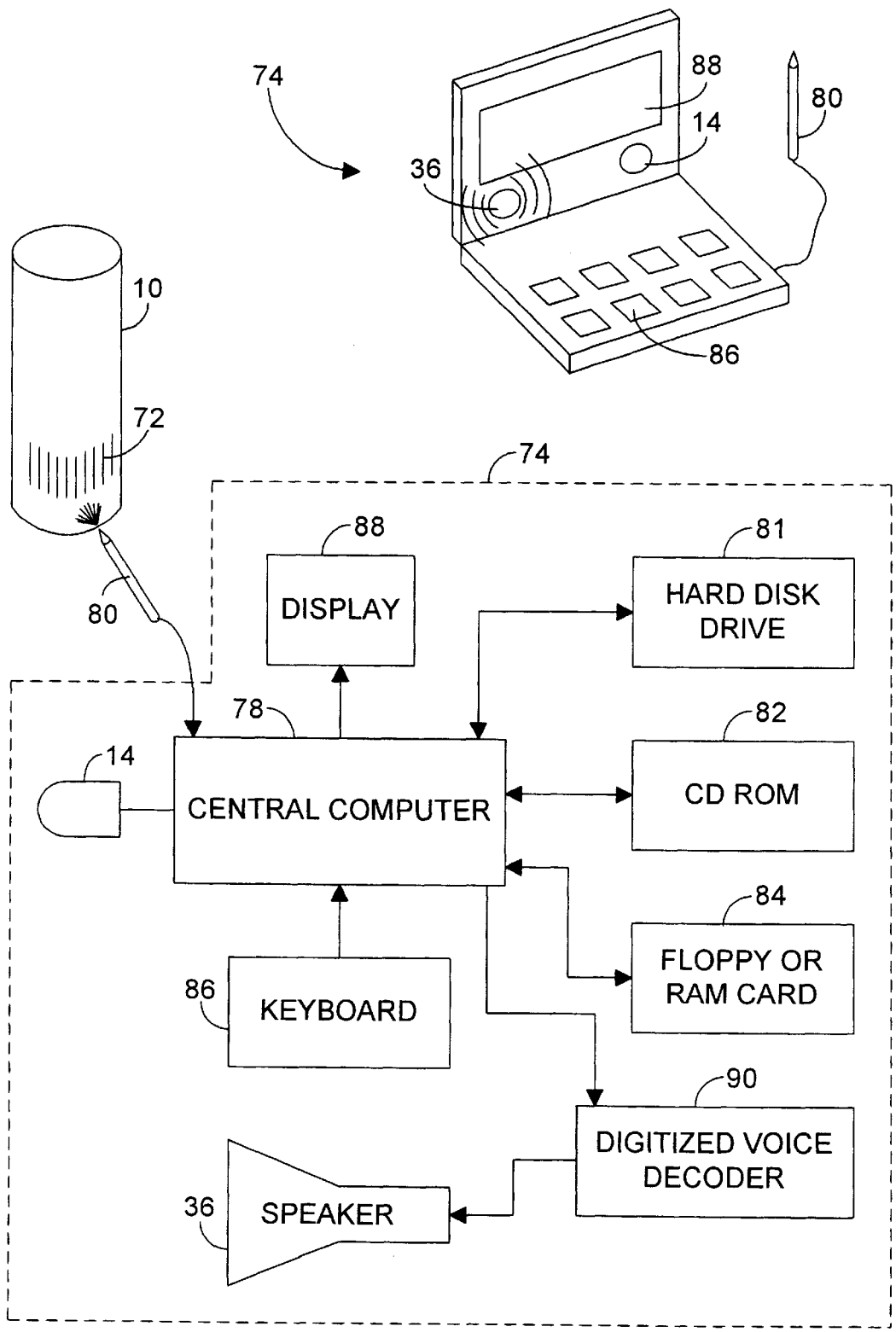
FIG. 11 is a perspective view and block diagram of an instructional apparatus for recording and retrieving a vocal message corresponding to a bar code.

Digital bar code, i.e., a stamp-sized patch of alternating thick and thin stripes with different spacings on a white background imprint, is a highly effective alternative to keyboard data entry. Bar-code scanning is faster and more accurate than key entry, optical character recognition and magnetic stripe encoding. Furthermore, bar code offers significant advantages and flexibility of media, simple placement and is relatively immune to electromagnetic fields. Still further, bar code information is generally placed on products sent from the manufacturer to the wholesale or retail stores and thereby generally available to consumers at the checkout line or while browsing the store shelves. Almost all products that are widely distributed for sale are now marked with bar codes. Retail stores or consumers themselves have access to bar code 72 via a central computer 78 placed within terminal 74. The computer can access vocal information regarding product 10 stored in memory and sends the information to terminals 74 for vocal reproduction and possibly display. Central computer 70 accesses bar code 72 using what is commonly called a wand 80. The hand-held wand 80 contains an optical LED sensor sensitive to 655 nanometer (nm) visible red light, 700 nm visible red light and 820 nm infrared energy, a photodetector IC (integrated circuit), and precision aspheric optics. A suitable hand-held wand 80 may be purchased from Hewlett Packard Corporation, Part Nos. HBCR, HBCS, HEDS, and/or 16800A. Regardless of which bar code wand 80 is chosen, wand 80 interfaces with central computer 78 placed upon hand-held or point-of-sale terminal 74. Central computer 78 accesses various memory medium such as hard disk drive 81, CD ROM 82, floppy disk or RAM card 84 as shown in FIG. 11. A plurality of vocal messages can be stored in the memory medium and addressed by computer 78 to operate as a voice recorder capable of recording voice messages within the chosen medium or to retrieve verbal message placed therein. A keyboard 86 can be placed proximate the outer surface of terminal 74 to access computer 78 and the various operational capabilities associated with computer 78. If desired, information can be presented on a local display 88. Moreover, vocal information can be retrieved from the chosen medium over selective addresses via computer 78 to a digitized voice decoder 90 of common design. The digitized voice recorder 90 preferably uses a suitable digital signal processor (DSP) such as Texas Instruments, Inc. Parts No. TMS320C10 with analog-to-digital and digital-to-analog convertors in a suitable voice coder data compression algorithm such as sub-band coder or other algorithm as described above. Retrieved vocal messages from decoder 90 can then be output to a speaker 36 so that the consumer can listen to instructional vocal messages regarding product 10.

If the amount of vocal information is extremely large, drive 80, ROM 82 and floppy or RAM card 84 can be placed at a remote site with access using electrode-lead contacts, radio-linked or infrared-linked transmissive paths as described above so that the hand-held unit can be made fairly small. CD ROM can store large amounts of digital audio information necessary to include substantial information concerning all the possible products to which bar code labels may identify. Audio information concerning all necessary information regarding a product can be quite lengthy and thereby requires large amounts of storage medium provided by the present invention.

Terminal 74 operates according to a simple addressing or matching methodology wherein wand 80 is scanned across code 72. Computer 78 then searches its memory (i.e., hard disk drive 80, CD ROM 82 or floppy/RAM card 84) for a bar code and verbal message match. When a match is found, computer 78 transfers the appropriate stored digital data to a digital voice decoder 90. The decoded information is then converted into soundwaves by speaker 36 for identification by the listener/user.

The foregoing description of the present invention has been directed to particular embodiments. It will be apparent, however, to those skilled in the art that modifications and changes in either the apparatus, system and/or method may be made without departing from the scope and spirit of the invention. Therefore, it is the Applicants' intention that the following claims cover all such equivalent modifications and variations which fall within the true spirit and scope of this invention.

What is claimed is:

1. A method for audio labeling products with a reusable label, comprising:

releasibly securing a label bearing an audio recorder to a first product;

sending a first verbal message concerning said first product to said label;

recording said first verbal message in said recorder;

subsequently retrieving said first verbal message in audio format from said recorder;

releasing said label from said first product and thereafter releasibly securing said label to a second product;

while erasing said first verbal message, sending a second verbal message concerning said second product to said label;

recording said second verbal message in said recorder; and subsequently retrieving said second verbal message in audio format from said recorder.

2. The method as recited in claim 1, wherein said recording step comprises inputting an electrical signal corresponding to said first and second verbal messages into an addressable array of storage elements.

3. The method as recited in claim 1, wherein said retrieving step comprises:

outputting a stored first and second electrical signal corresponding to said first and second verbal messages from an addressable array of storage elements; and converting said first and second electrical signals to signals similar to said first and second verbal messages.

4. An instructional apparatus, comprising:

a bar code label attachable to a product;

recording means capable of recording a vocal message into a storage device corresponding to said bar code label, wherein said recording means comprises a voice recorder capable of recording said vocal message as telephone quality voice input; and retrieving means capable of reproducibly retrieving said vocal message indicative of an identifiable characteristic associated with said product, wherein said retrieving means comprises a speaker operable to reproduce and vocalize said recorded vocal message as telephone quality voice output.

* * * * *